(12) United States Patent
Purgatorio et al.

(10) Patent No.: US 8,688,482 B1
(45) Date of Patent: Apr. 1, 2014

(54) CLAIM SATISFACTION GUARANTEE

(75) Inventors: Ginger Purgatorio, Algonquin, IL (US); Edward A. Biemer, Glencoe, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 13/269,081

(22) Filed: Oct. 7, 2011

(51) Int. Cl.
   *G06Q 40/00* (2012.01)
   *G06Q 40/08* (2012.01)

(52) U.S. Cl.
   CPC ............... *G06Q 40/00* (2013.01); *G06Q 40/08* (2013.01)
   USPC ................................................ 705/4; 705/35

(58) Field of Classification Search
   CPC .............................. G06Q 40/00; G06Q 40/08
   USPC ....................................................... 705/4, 35
   See application file for complete search history.

(56) References Cited

U.S. PATENT DOCUMENTS

| | | | | |
|---|---|---|---|---|
| 8,086,474 | B1 * | 12/2011 | Lasalle et al. | 705/4 |
| 2001/0034621 | A1 * | 10/2001 | Kirsh et al. | 705/4 |
| 2001/0044729 | A1 * | 11/2001 | Pomerance | 705/1 |
| 2002/0002475 | A1 * | 1/2002 | Freedman et al. | 705/4 |
| 2002/0007289 | A1 * | 1/2002 | Malin et al. | 705/4 |
| 2002/0138308 | A1 * | 9/2002 | Harada et al. | 705/4 |
| 2002/0138338 | A1 * | 9/2002 | Trauth et al. | 705/10 |
| 2002/0178033 | A1 * | 11/2002 | Yoshioka et al. | 705/4 |
| 2005/0021374 | A1 * | 1/2005 | Allahyari | 705/2 |
| 2005/0086180 | A1 * | 4/2005 | Wamsley et al. | 705/80 |

OTHER PUBLICATIONS

Allstate; Allstate tests claim satisfaction guarantee in Indiana, Ohio and Michigan. (2011). Investment Weekly News, 403. Retrieved Jan. 16, 2013.*

Allstate tests claim satisfaction guarantee in indiana, ohio and michigan. (Dec. 14, 2010). PR Newswire. Retrieved Jun. 18, 2013.*

New Orbit Auto Inc.—Warranty—http://www.minivanscountry.com/ebay-warranty.htm; retrieved from the internet on May 13, 2010; 5 pages.

4UBenefits—MITechNews Benefit Plan—Account Setup (https://www.4ubenefits.com/mitechnews/Enroll.aspx); accessed online May 10, 2010; 3 pages.

Smart Shopper—Guide to Benefits Mastercard Cardholder Smart Shopper Benefits; 2005; 10 pages.

CrankySaver—Punt on GM's Guarantee. Take The Rebate; Sep. 27, 2009; 2 pages.

GMAC Auto Insurance Review; Oct. 27, 2009; 5 pages.

Gateway, Inc., and eMachines, Inc.—6800 Series Notebook Customer Satisfaction Program Claim Form; retrieved online May 11, 2010; 1 page.

AARP Financial—AARP Auto Insurance Program Claim Service Guarantee; Retrieved online May 11, 2010; 19 pages.

(Continued)

*Primary Examiner* — Kito R Robinson
(74) *Attorney, Agent, or Firm* — Banner & Witcoff, Ltd.

(57) ABSTRACT

Aspects of the disclosure include computer-implemented methods and apparatus for providing an insurance claim satisfaction guarantee. The computer-implemented method or apparatus may include an insurance claim satisfaction guarantee server that receives a dissatisfaction notice based on a customer service guarantee received during an insurance claim and verifies that a loss payment was awarded on the insurance claim. Additionally, the insurance claim satisfaction guarantee server may determine that the dissatisfaction notice was received within a period of time of the insurance claim. Furthermore, the insurance claim satisfaction guarantee server may issue a guarantee payment in the amount equal to an insurance premium if the loss payment was awarded and the dissatisfaction notice was provided within the time period.

20 Claims, 5 Drawing Sheets

(56) References Cited

OTHER PUBLICATIONS

Sinclair insurance—14-Day Satisfaction Guarantee; 2010; 2 pages.
Sun Life Financial—Our Life Claims and Waiver of Premium Promise: Smart Processes that make things easy; Dec. 2007; 3 pages.
Aviva Canada—Aviva Claims Service Guarantee—http://avivacanada.com/content/overview; Retreived online May 14, 2010; 2 pages.
Sun Life Financial—Money-Back Service Guarantee—http://www.sunlifeusa.com/group/servicegurantee.cfm; Retrieved online May 13, 2010; 2 pages.
Sun Life Financial—Group Disability; Dec. 2007; 12 pages.
Total Client Service Satisfaction Guarantee—McLean Insurance Live.com—Ontario, Canada Insurance quotes online. Online; http://www.mcleaninsurancelive.com/triple.html; Retrieved May 13, 2010; 3 pages.

\* cited by examiner

CLAIM SATISFACTION GUARANTEE

FIELD OF THE INVENTION

The disclosure relates generally to insurance claims. More specifically, the disclosure provides computer-implemented methods and systems for providing an insurance claim satisfaction guarantee.

BACKGROUND

Insurance companies generally offer insurance policies on many different items that are important to consumers, automobile, home, life, etc. When a loss occurs to one of the items covered by an insurance policy, such as an accident, injury, theft, or weather-related incident, the consumer may then file a claim with the insurance company for that covered item. When the claim is filed, the insurance company will then initiate the claims process. During the claims process, there are many activities with the insurance company and many interactions with third-parties for the consumer.

The claims process and the claim-related incident can be stressful and emotionally-draining on a consumer. The loss associated with the insurance claim can be difficult enough. The claims process should not further negatively impact the customer because of a lack of customer service level involved in the claims process. There is a need in the insurance field for a comprehensive insurance claim satisfaction guarantee to help ensure that the customer receives an acceptable level of customer service throughout the claims process.

BRIEF SUMMARY

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

A first aspect of the disclosure provides a computer-implemented method of providing an insurance claim satisfaction guarantee. The method may comprise: (1) receiving a dissatisfaction notice based on a level of customer service received during an insurance claim; (2) verifying that a loss payment was awarded on the insurance claim; (3) determining that the dissatisfaction notice was received within a period of time of the insurance claim; and (4) issuing a guarantee payment amount equal to an insurance premium if the loss payment was awarded and the dissatisfaction notice was provided within the time period. Additionally, the satisfaction guarantee may include any of the following: decisions based on a coverage level for the insurance claim, decisions based on a settlement amount for the insurance claim, decisions based on a fault determination of the insurance claim, or customer service from insurance company representatives or third-party vendors related to the insurance claim.

Another aspect of the disclosure comprises an apparatus comprising a memory, a display, and a processor coupled to the memory and programmed with computer-executable instructions. The computer-executable instructions may include steps for: (a) receiving a dissatisfaction notice based on a level of customer service received during an insurance claim; (b) verifying that a loss payment was awarded on the insurance claim; (c) determining that the dissatisfaction notice was received within a period of time of the insurance claim; and (d) issuing an additional payment in the amount equal to an insurance premium if the loss payment was awarded and the dissatisfaction notice was provided within the time period. Additionally, the elements of the claim process subject to the guarantee may include any of the following: decisions based on a coverage level for the insurance claim, decisions based on a settlement amount for the insurance claim, decisions based on a fault determination for the insurance claim, or customer service from third-party vendors related to the insurance claim.

The details of these and other embodiments of the present disclosure are set forth in the accompanying drawings and the description below. Other features and advantages of the disclosure will be apparent form the description and drawings.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Aspects of the disclosure provide a computer-implemented-method and system for providing an insurance claim satisfaction guarantee to an insured related to the claim process. When an insured is required to file an insurance claim, the claims process can be difficult and trying enough. The insurance claim may include, but is not limited to, accident claims for automobiles, loss claims for property or home, or loss claims for personal property. The claims process should not make recovery from the loss more difficult or emotionally, financially, and/or physically worse for the insured. The methods and systems described herein will provide an insurance claim satisfaction guarantee to an insured if the insured is dissatisfied with the insurance company's handling of the paid insurance claim for any reason. The insurance claim satisfaction guarantee may be the return of an amount equal to the insurance premium for the applicable insurance policy period.

Figure 1:
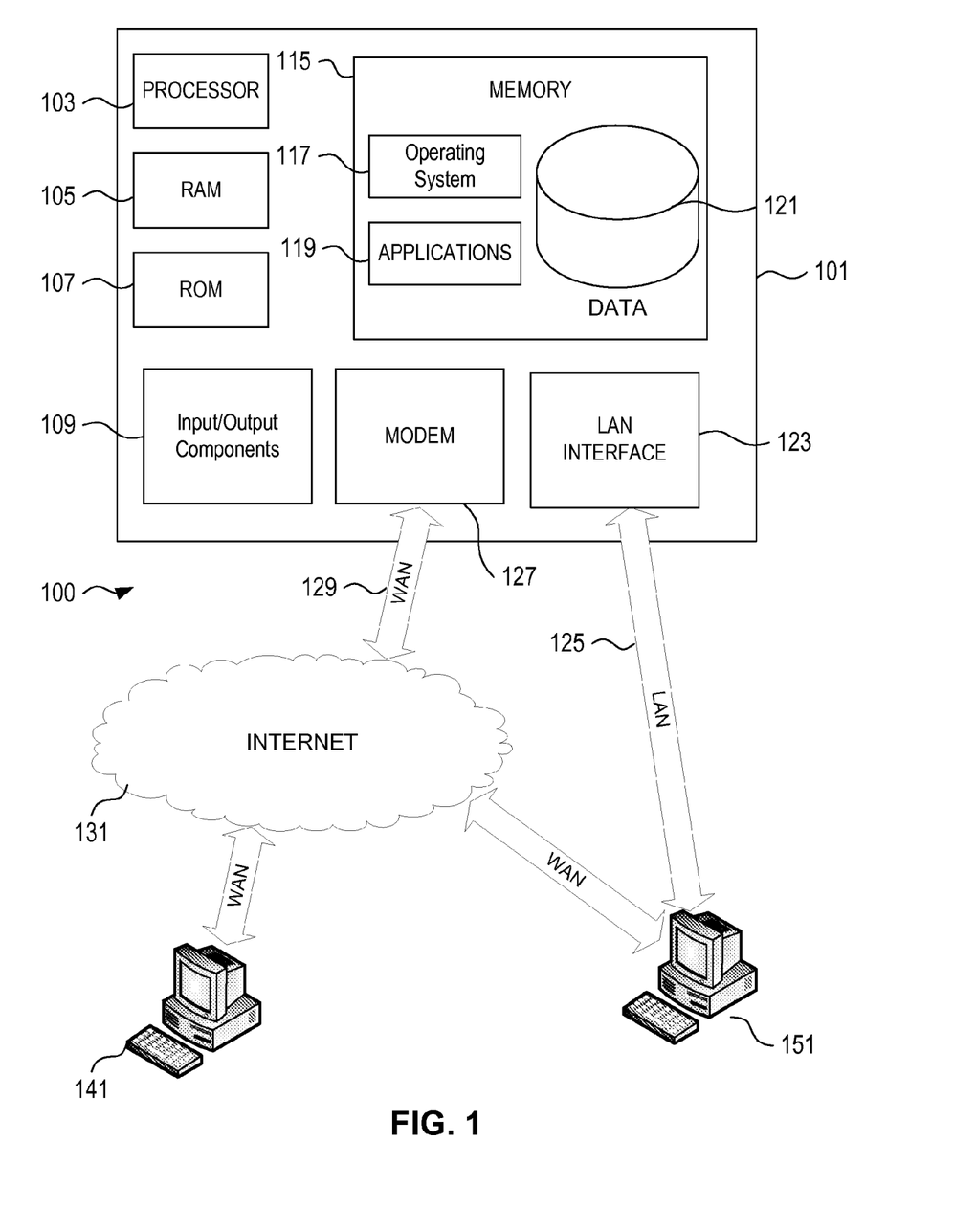
FIG. 1 is an illustrative operating environment in which various aspects of the disclosure may be implemented.

FIG. 1 illustrates a block diagram of an insurance claim satisfaction guarantee server 101 (e.g., a computer server) in communication system 100 that may be used according to an illustrative embodiment of the disclosure. The insurance claim satisfaction guarantee server 101 may have a processor 103 for controlling overall operation of the insurance claim satisfaction guarantee server 101 and its associated components, including RAM 105, ROM 107, input/output component 109, and memory 115.

I/O 109 may include a microphone, keypad, touch screen, and/or stylus through which a user of the insurance claim satisfaction guarantee server 101 may provide input, and may also include one or more of a speaker for providing audio output and a video display device for providing textual, audiovisual and/or graphical output. Software may be stored within memory 115 and/or storage to provide instructions to processor 103 for enabling the insurance claim satisfaction guarantee server 101 to perform various functions. For example, the memory 115 may store software used by the insurance claim satisfaction guarantee server 101, such as an operating system 117, application programs 119, and an associated database 121. The processor 103 and its associated components may allow the insurance claim satisfaction guarantee server 101 to run a series of computer-readable instructions to generate a claim satisfaction structure (and particularly a dissatisfaction notice) for a particular individual and analyze the claim satisfaction structure to determine the viability of the dissatisfaction notice for each individual claim. For instance, when a dissatisfaction notice is received, the processor 103 may verify that a loss payment was awarded on the accident claim. In addition, the processor 103 may determine if a dissatisfaction notice was received within a period of time of the insurance claim. Further still, processor 103 may aid in sending a payment in the amount equal to an insurance premium if the loss payment was awarded and the dissatisfaction notice was provided within the time period.

The insurance claim satisfaction guarantee server 101 may operate in a networked environment supporting connections to one or more remote computers, such as terminals 141 and 151. The terminals 141 and 151 may be personal computers or servers that include many or all of the elements described above relative to the insurance claim satisfaction guarantee server 101. Alternatively, terminal 141 and/or 151 may be data stores for storing information related to a community member's contacts. The network connections depicted in FIG. 1 include a local area network (LAN) 125 and a wide area network (WAN) 129 but may also include other networks. When used in a LAN networking environment, the insurance claim satisfaction guarantee server 101 is connected to the LAN 125 through a network interface or adapter 123. When used in a WAN networking environment, the insurance claim satisfaction guarantee server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Additionally, an application program 119 used by the insurance claim satisfaction guarantee server 101 according to an illustrative embodiment of the disclosure may include computer executable instructions for invoking functionality related to receiving, verifying, determining, and analyzing a dissatisfaction notice based on a level of customer service received during an insurance claim.

The insurance claim satisfaction guarantee server 101 and/or terminals 141 or 151 may also be mobile terminals including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, mobile devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program applications or modules, being executed by a computer. Generally, program applications or modules include routines, programs, objects, components, data structures, etc. that perform particular tasks or implement particular abstract data types. The disclosure may also be practiced in distributed computing environments where tasks are performed by remote processing devices that are linked through a communications network. In a distributed computing environment, the program applications or modules may be located in both local and remote computer storage media including memory storage devices.

Figure 2:
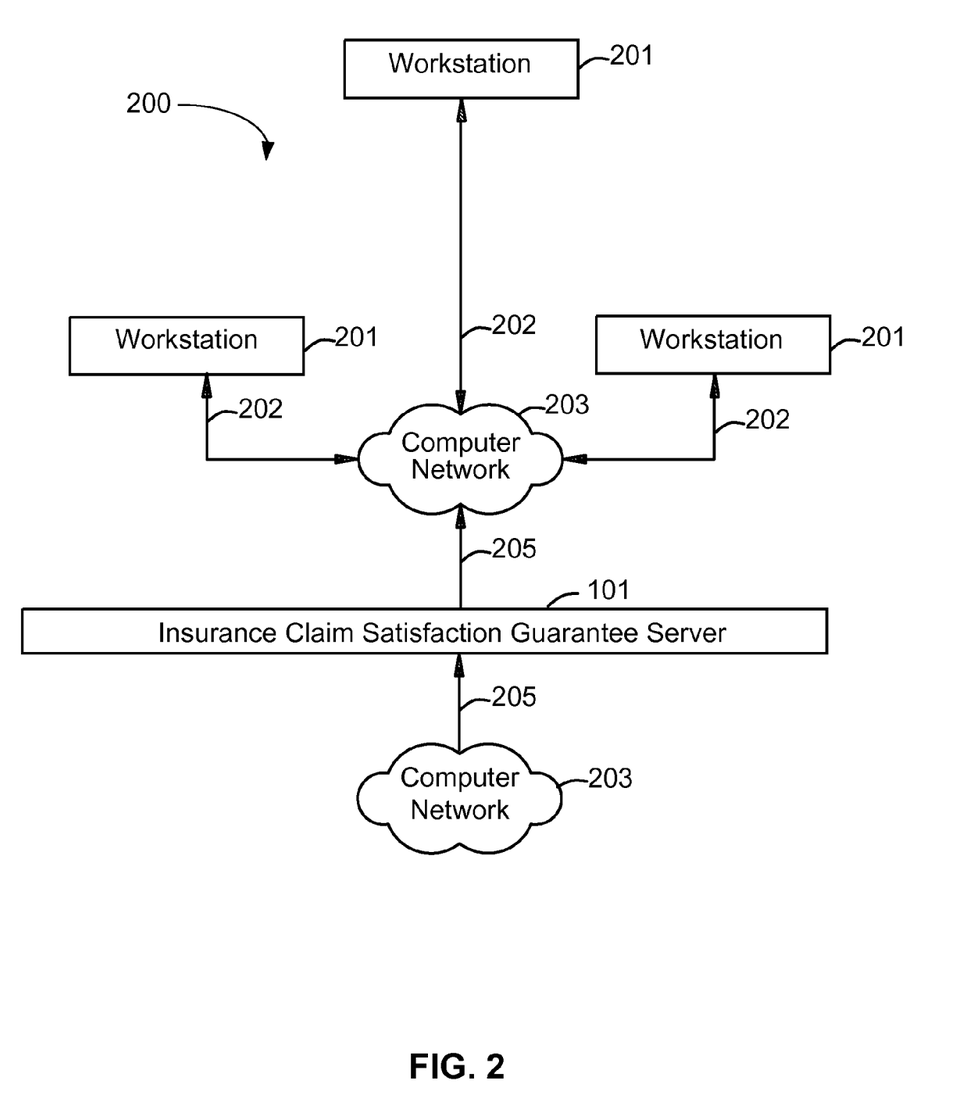
FIG. 2 is an illustrative block diagram of workstations and servers that may be used to implement the processes and functions of certain aspects of the present disclosure.

Referring to FIG. 2, an illustrative system 200 for implementing methods according to the present disclosure is shown. As illustrated, the system 200 may include one or more workstations/servers 201. The workstations 201 may be local or remote, and are connected by one or more communications links 202 to the computer network 203 that is linked via communications links 205 to enhance the insurance claim satisfaction guarantee server 101. In certain embodiments, workstations 201 may run different algorithms used by the insurance claim satisfaction guarantee server 101 for generating an insurance claim structure, or, in other embodiments, workstations 201 may be different points at which the insurance claim satisfaction guarantee server 101 may be accessed. In the system 200, the insurance claim satisfaction module 204 may be any suitable server, processor, computer, or data processing device, or combination of the same.

The computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. The communications links 202 and 205 may be any communications links suitable for communicating between the workstations 201 and the server 204, such as network links, dial-up links, wireless links, hard-wired links, etc.

In an aspect of the disclosure, a claim satisfaction guarantee is offered by an insurance company. For example, if a customer is dissatisfied with the handling of the insurance company's handling of a paid insurance claim for any reason, the insurance company may return an amount equal to that insurance premium for the applicable policy period. In an exemplary embodiment, the customer is not required to "prove" their dissatisfaction. In order to qualify for the claim satisfaction guarantee, the following criteria may be used in order for the guarantee to apply: 1) the insurance company may have made some loss payment for the accident and insurance claim; 2) the insured/customer may have notified the insurance company of their dissatisfaction within a required time period and provide the reason for their dissatisfaction. The time period may be for example, 180 days from the date of the accident. The loss payment may be either to the insured or to a third party on the insured's behalf. The loss payment may also be to the owner of the insurance policy. Additionally, the notification may be in writing through a letter. Additionally, the notification may be received via internet form or verbally through a customer service call line without departing from this invention.

In another embodiment without departing from this disclosure, the insurance company may offer a claim satisfaction guarantee program for automobile insurance. Other kinds of insurance may be offered under a claim satisfaction guarantee program without departing from this invention. For example, the insurance company may send new and existing customers a notice of their eligibility for the claim satisfaction guarantee program via marketing materials, at the point of sale, and through an endorsement to their automobile policy. When a customer is dissatisfied with the handling of their paid automobile insurance claim, the customer may be directed to file their dissatisfaction notice through the insurance claim satisfaction guarantee server 101, through either a letter or through an internet form. The insurance claim satisfaction guarantee server 101 may review each submission to validate that 1) a loss payment was made on the claim in question, and 2) that notice of dissatisfaction was provided within the required time period. If both criteria are met, the insurance claim satisfaction guarantee server 101 may return to the customer via a payment an amount equal to that vehicle's premium of the date of the loss. Potentially, the insurance claim satisfaction guarantee server 101 may subtract state/county/or municipal fees/taxes from the return payment. If either criterion is not met, the insurance claim satisfaction guarantee server 101 may generate a letter and send the letter to the customer notifying them of the reason for the denial of the guarantee.

Figure 3A:
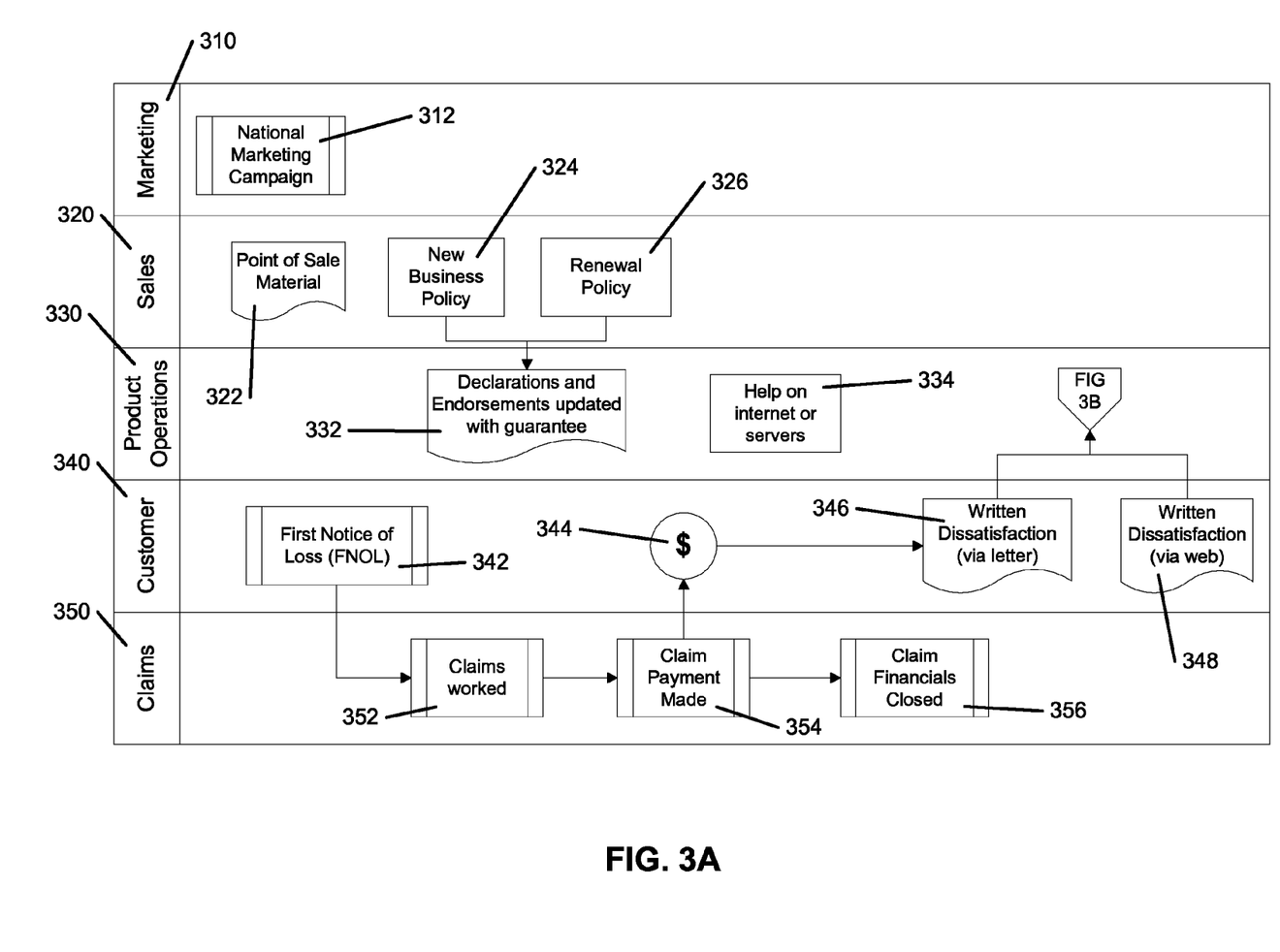
FIGS. 3A and 3B illustrate an exemplary workflow diagram that may be used to implement various aspects of the disclosure.
Figure 3B:
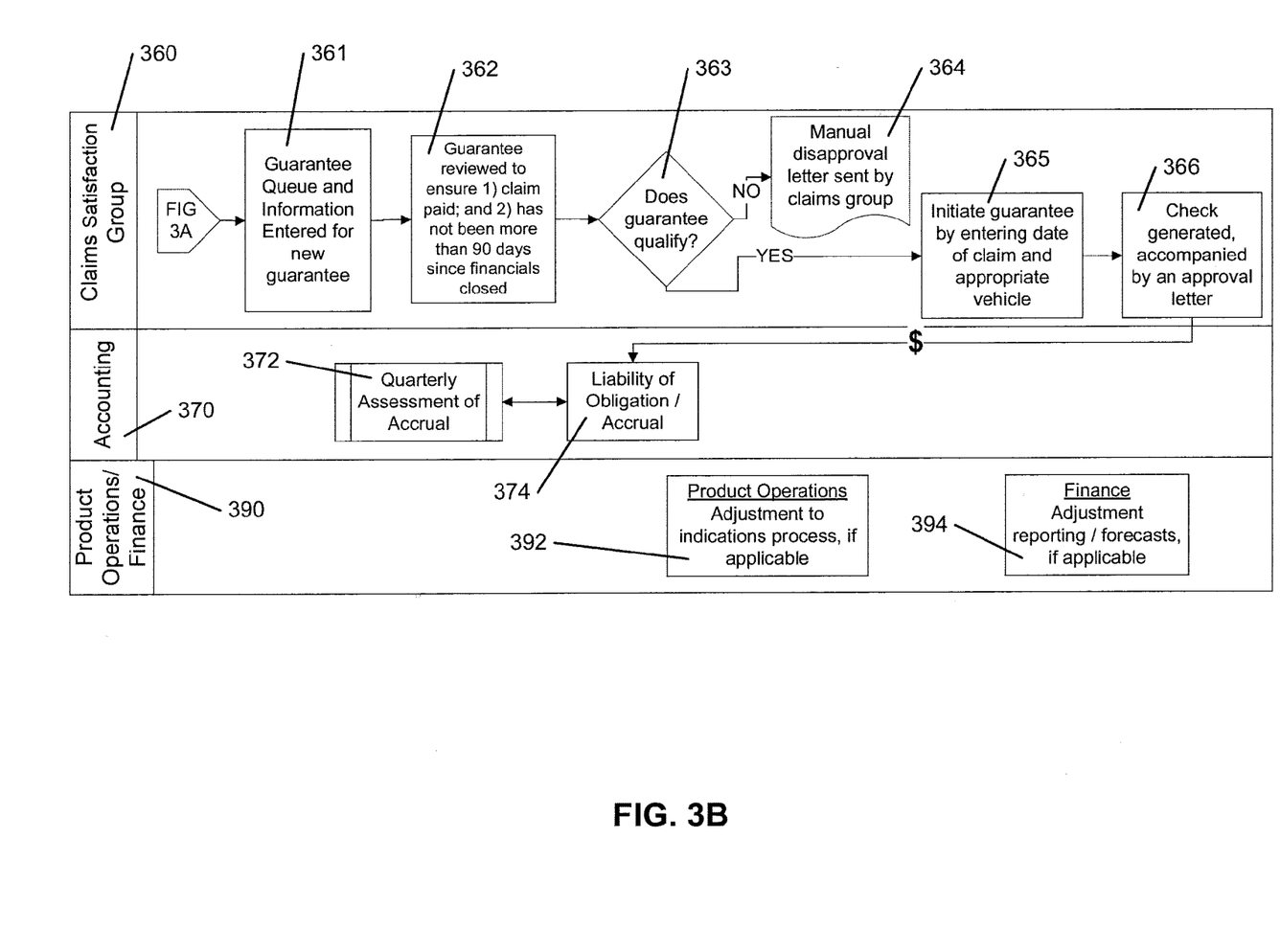

In another embodiment of the disclosure, FIG. 3 shows an illustrative workflow for a claim satisfaction guarantee program. As illustrated in FIG. 3, other example servers or processors make up the workflow of the claim satisfaction guarantee program. For example, the workflow may include servers or processors such as, a marketing server 310, a sales server 320, a product operations server 330, a customer server 340, a claims server 350, a claims satisfaction server 360, an accounting server 370, a tax server 380, and a product operations/finance server 390. Other server or processor names may be utilized without departing from this invention.

The exemplary claim satisfaction guarantee program may include a national marketing campaign 312 through advertising to include print, television, and internet. In addition to the national marketing campaign 312, a sales server 320 may develop and distribute point of sale materials 322 communicating the claim satisfaction guarantee program. Additionally, the sales server 320 may modify and distribute a new business policy 324 and a new renewal policy 326. The new business policy 324 and the new renewal policy 326 may create updates with the claim satisfaction guarantee to the declarations and endorsements 332 for individual customers through the product operations server 330. Additionally, the product operations server 330 may provide help and direction on the new claim satisfaction guarantee program on the internet or the insurance company's website 334, such as frequently asked questions.

As would normally occur when a customer has a loss or claim situation, the customer may file a first notice of loss (FNOL) 342 through the customer server 340 or the claims server 350 with an insurance company. This first notice of loss 342 may be in the form of a phone call, internet claim, or other methods/means available. The FNOL 342 may be sent to the claims server 350, wherein the claims server 350 reviews and handles the claim or processes the claim 352. Following the processing of the claim 352, the claims server 350 may process the claim payment 354 made to the customer. This payment can be in a variety of different forms, to include money or a check paid directly to the customer or money/payments sent to a repair shop providing the repairs for the insurance claim. After the payment is made 354, the claims server 350 closes the claim financials and settles the claim 352.

If the customer, at any time and for any reason, is dissatisfied with the customer service level during the claims process, customer may file a dissatisfaction notice. The customer server 340 or the insurance claim satisfaction guarantee server 101 (as described above with FIGS. 1 and 2) may receive the dissatisfaction notice. The customer does not need to prove dissatisfaction. No further questions may be asked of the customer when filing a dissatisfaction notice. The customer server 340 may receive a written dissatisfaction letter 346 from the customer, or if available, the customer server 340 may receive a written notice of dissatisfaction via a form on the internet or the insurance company's website 348. After the customer server 340 receives either a written dissatisfaction letter 346 or a written dissatisfaction form via the internet 348, a claims satisfaction server 360 may then place a guarantee in the queue and start transferring or processing information for the new guarantee 361, thereby populating and filling the guarantee list. The dissatisfaction notice is then reviewed (for example by an insurance claim satisfaction guarantee server 101 as described above in FIGS. 1 and 2) to ensure two requirements are met 362. First, the insurance claim satisfaction guarantee server 101 will verify that the claim has been paid 354. Second, insurance claim satisfaction guarantee server 101 will verify that the dissatisfaction notice was provided within a required time period. For example, the time period may be 90 days since the financials closed or 90 days since the claims settlement. Other example requirements may be required, supplemented, or exchanged for the above requirements. For example, another requirement might be that the dissatisfaction must be provided within 180 days of the loss. Additionally, another requirement might be that the dissatisfaction includes a reason of dissatisfaction.

The insurance claim satisfaction guarantee server 101 may then determine if the guarantee qualifies 363 by meeting the requirements set by the insurance company. If the guarantee does not qualify, then the insurance claim satisfaction guarantee server 101 may generate and send a letter from the insurance company communicating the disapproval to the customer 340. If on the other hand, the guarantee does qualify by meeting the requirements set by the insurance company, the insurance claim satisfaction guarantee server 101 may then initiate the guarantee 365. When the guarantee is initiated, generally, the insurance claim satisfaction guarantee server 101 receives or processes the date of the claim and the appropriate vehicle. After the guarantee has been initiated, the insurance claim satisfaction guarantee server 101 generates a payment or check in amount equal to the premium and sends the payment or check to the customer 340. Additionally, the insurance claim satisfaction guarantee server 101 may generate an approval letter 366 and send this approval letter to the customer 340 with the payment or check.

In a further aspect of the disclosure, an accounting server 370 may perform periodic assessments of the accruals for the claim satisfaction guarantees 372. These assessments will preferably be quarterly assessments; however, these assessments can cover other time periods without departing from this invention, such as monthly, bi-monthly, semi-annually, annually, or bi-annually. Additionally, when the check is generated and the satisfaction guarantee is paid, the accounting server 370 records the liability of the obligation/accrual. Finally, the product operations server 330 may make adjustments to the indications process if applicable 392. Additionally, the finance server 390 may make adjustments to the reporting and forecasting of the claim satisfaction guarantee program if applicable.

In an aspect of the disclosure, the level of customer service or the customer service guarantee can include anything the customer feels dissatisfied with throughout the claims process, and may include any number of different areas. The customer's lack of satisfaction may be subjective and include, but not be limited any of the following items. For example, the customer service guarantee may include the customer being dissatisfied with decisions based on a coverage level for the insurance claim. The customer service guarantee may also include decisions based on a settlement amount for the insurance claim. The customer service guarantee may include decisions based on a fault determination for the insurance claim. The customer service guarantee may also include customer service from insurance representatives and/or third-party vendors related to the insurance claim. The third-party vendors may include one or more of the following: rental car companies associated with the insurance claim, automobile repair shops that perform the repairs on a vehicle for an insurance claim, automobile glass shops that repair the glass on a vehicle for an insurance claim, automobile towing companies for the vehicle for an insurance claim, and/or automobile painting companies for the vehicle for an insurance claim. These are just an exemplary list of third-party vendors and other third-party vendors may be included without departing from this invention.

In another aspect of the disclosure, other forms of payment or compensation to the customer may be utilized without departing from this invention. For example, instead of sending a check to the customer, the insurance claim satisfaction guarantee server 101 may credit a customer's 340 account with the value of the premium. A check may be preferable because a physical check may be more tangible to the customer and while the payment may be equal to the premium for the vehicle at the time of the loss, the amount of the payment may not be enough to cover the entire premium due on the policy, which could result in confusion for the customer.

In another aspect of the disclosure, the amount of the payment, check or crediting to the account may be different than the amount of the premium without departing from this invention. For example, the amount may be equal to a fixed value, such as $500. Or in another example, the amount may be equal to what has been paid into the account for the past 6-month or 12 month period. In yet another example, the amount may be equal to a deductible for a given insurance policy.

In another aspect of the disclosure, the time period for expressing a customer's dissatisfaction may be any time period without departing from this invention. As an example, the time period may be 90 days from the date the financials were closed for the insurance claim or 90 days from when the claim was settled. In another example, the time period may be 180 days from the date of the loss. In another example, the time period may be 180 days from the date the insurance claim was initiated. In yet another example, the time period may be 90 days from the date that the payment was made from the insurance company. The time limit is preferable in order for the insurance company to avoid having to carry a contingent liability indefinitely. The time period should be long enough to ensure the majority of claims submitted would be completely closed before the time period expires.

In another aspect of the disclosure, the insurance claim satisfaction guarantee server 101 may not exclude any insurance claim scenarios from the insurance claim satisfaction guarantee. All qualifying losses may be eligible for the insurance claim satisfaction guarantee. The guarantee is not dependent in any way upon the details of the claim. All claim scenarios may be included in the estimate for the cost of the guarantee.

In yet another aspect of the disclosure, the insurance claim satisfaction guarantee server 101 may not exclude any insurance billing cycle scenarios from the insurance claim satisfaction guarantee. All qualifying losses may be eligible for the insurance claim satisfaction guarantee. For example, if the guarantee occurs in the current policy period, the customer would receive a guarantee payment in the amount of their current policy period for the appropriate/applicable vehicle and continue to be billed per the normal billing schedule for that same vehicle. In this scenario, it is possible that the customer will receive a check for an amount greater than the amount they have already paid in for the insurance policy for the given policy term.

In yet another aspect of the disclosure, the loss or insurance claim may include a catastrophic loss, such as tornado. The insurance claim satisfaction guarantee server 101 may not exclude any loss from the insurance claim satisfaction guarantee.

Figure 4:
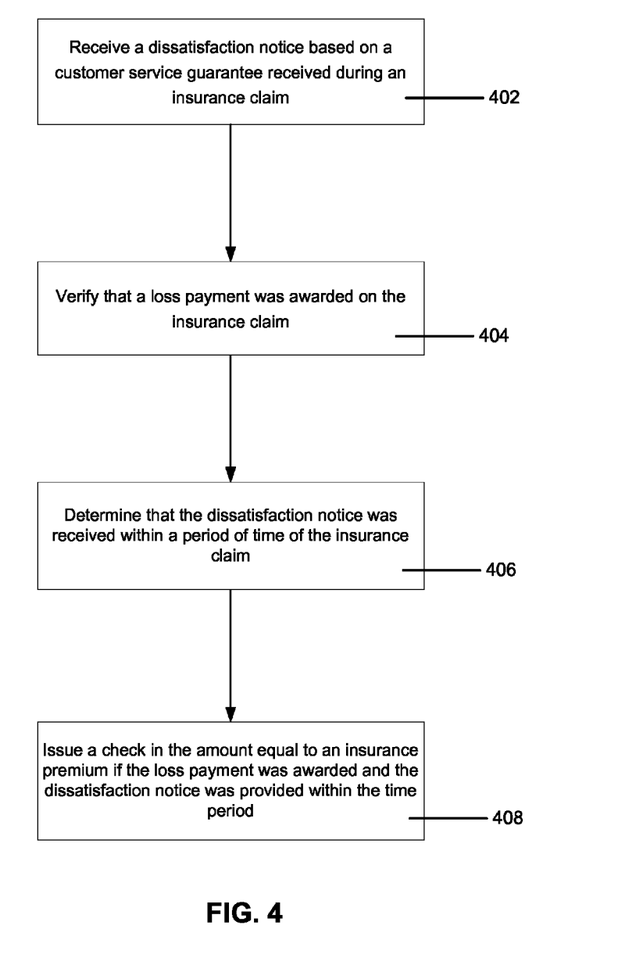
FIG. 4 illustrates a method of providing an insurance claim satisfaction guarantee in accordance with aspects of this invention.

The steps that follow in FIG. 3 may be implemented by one or more of the components in FIGS. 1 through 3B and/or other components, including other computing devices. FIG. 4 illustrates a computer-implemented method of providing an insurance claim satisfaction guarantee in accordance with an aspect of the disclosure. In FIG. 4, at step 402, a dissatisfaction notice is received based on a level of customer service received during an insurance claim. The customer service guarantee can include anything the customer feels dissatisfied with, and include any number of different areas. For example, the customer service guarantee may include the customer being dissatisfied with decisions based on a coverage level for the insurance claim. The customer service guarantee may also include decisions based on a settlement amount for the insurance claim. The customer service guarantee may include decisions based on a fault determination for the insurance claim. The customer service guarantee may also include customer service from third-party vendor related to the insurance claim. The third-party vendors may include one or more of the following: rental car companies associated with the insurance claim, automobile repair shops that perform the repairs on a vehicle for an insurance claim, automobile glass shops that repair the glass on a vehicle for an insurance claim, automobile towing companies for the vehicle for an insurance claim, and/or automobile painting companies for the vehicle for an insurance claim. These are just an exemplary list of third-party vendors and other third-party vendors may be included without departing from this invention.

Next, at step 404, a loss payment awarded on the insurance claim is verified. A loss payment may include either a payment or check to the customer or the insured in an amount equal to the repairs or equal to the repairs minus a deductible. Additionally, the loss payment may include a payment or settlement with a vehicle repair shop that repairs the vehicle for the insurance claim.

In step 406, the computer-implemented method includes the step of determining that the dissatisfaction notice was received within a required time period. The time period may be any time period without departing from this invention. As an example, the time period may be 90 days from the date the financials were closed for the insurance claim. In another example, the time period may be 180 days from the date of the loss. In another example, the time period may be 180 days from the date the insurance claim was initiated. In yet another example, the time period may be 90 days from the date that the payment was made from the insurance company.

Next, in step 408, a check is issued in the amount equal to an insurance premium if the loss payment was awarded and the dissatisfaction notice was provided within the time period. In addition to or taking the place of the check being issued, a customer's account may be credited an amount equal to an insurance premium if the loss payment was awarded and the dissatisfaction notice was provided within the time period. In an aspect of the invention, the amount is equal to a 6- or 12-month insurance premium and not the amount that a customer has paid in. Therefore, it is possible that the amount equal to the premium could exceed an amount that the customer has already paid for an insurance policy.

While the invention has been described with respect to specific examples includes presently preferred modes of carrying out the invention, those skilled in the art will appreciate that there are numerous variations and permutations of the above described systems and techniques that fall within the spirit and scope of the invention.

We claim:

1. A computer-implemented method comprising:
receiving an insurance dissatisfaction notice based on a customer service guarantee received during an insurance claim;
verifying, by a claim satisfaction guarantee computer server, that a loss payment was awarded on the insurance claim;
determining, by the claim satisfaction guarantee computer server, that the dissatisfaction notice was received within a period of time of the insurance claim; and
issuing, by the claim satisfaction guarantee computer server, a guarantee payment, wherein the guarantee payment is in the amount equal to an insurance premium if the loss payment was awarded and the dissatisfaction notice was provided within the time period.

2. The method of claim 1, wherein the customer service guarantee includes decisions based on a coverage level for the insurance claim.

3. The method of claim 1, wherein the customer service guarantee includes decisions based on a settlement amount for the insurance claim.

4. The method of claim 1, wherein the customer service guarantee includes decisions based on a fault determination of the accident for the insurance claim.

5. The method of claim 1, wherein the customer service guarantee includes customer service from third-party vendors related to the insurance claim.

6. The method of claim 5, wherein the third-party vendors includes at least one from the group consisting of: rental car companies, automobile repair shops, automobile glass shops, automobile towing companies, and automobile painting companies.

7. The method of claim 1, wherein the insurance claim includes a catastrophic accident.

8. The method of claim 1, wherein the issuing of a payment in the amount equal to an insurance premium exceeds an amount a customer has paid for an insurance policy.

9. The method of claim 1, wherein the time period comprises a time period equal to 180 days after the accident.

10. The method of claim 1, wherein the time period comprises a time period equal to 90 days after the guarantee payment has been completed for a claim settlement.

11. An apparatus comprising:
a memory;
a display; and
a processor coupled to the memory and programmed with computer-executable instructions for performing steps comprising:
(a) receiving a dissatisfaction notice based on a customer service guarantee received during an insurance claim;
(b) verifying that a loss payment was awarded on the insurance claim;
(c) determining that the dissatisfaction notice was received within a period of time of the insurance claim; and
(d) issuing a payment in the amount equal to an insurance premium if the loss payment was awarded and the dissatisfaction notice was provided within the time period.

12. The apparatus of claim 11, wherein the customer service guarantee includes decisions based on a coverage level for the insurance claim.

13. The apparatus of claim 11, wherein the customer service guarantee includes decisions based on a settlement amount for the insurance claim.

14. The apparatus of claim 11, wherein the customer service guarantee includes decisions based on a fault determination of the accident for the insurance claim.

15. The apparatus of claim 11, wherein the customer service guarantee includes customer service from third-party vendors related to the insurance claim.

16. The apparatus of claim 15, wherein the third-party vendors includes at least one from the group consisting of: rental car companies, automobile repair shops, automobile glass shops, automobile towing companies, and automobile painting companies.

17. The apparatus of claim 11, wherein the insurance claim includes a catastrophic accident.

18. The apparatus of claim 11, wherein the issuing of a check in the amount equal to an insurance premium could exceed an amount a customer has paid for an insurance policy.

19. The apparatus of claim 11, wherein the time period is equal to 90 days after a payment has been completed for a claim settlement.

20. A computer-implemented method comprising:
receiving an insurance dissatisfaction notice based on a level of customer service received during an insurance claim;
verifying, by a claim satisfaction guarantee server, that a loss payment was awarded on the insurance claim;
determining, by a claim satisfaction guarantee server, that the dissatisfaction notice was received within a period of time of the insurance claim; and
crediting, by a claim satisfaction guarantee server, a customer's account in the amount equal to an insurance premium if the loss payment was awarded and the dissatisfaction notice was provided within the time period.

* * * * *